(12) United States Patent
Dattani et al.

(10) Patent No.: US 7,010,044 B2
(45) Date of Patent: Mar. 7, 2006

(54) INTRA 4×4 MODES 3, 7 AND 8 AVAILABILITY DETERMINATION INTRA ESTIMATION AND COMPENSATION

(75) Inventors: Doni S. Dattani, Waterloo (CA); Lowell L. Winger, Waterloo (CA); Simon Booth, Kitchener (CA)

(73) Assignee: LSI Logic Corporation, Milpitas, CA (US)

( * ) Notice: Subject to any disclaimer, the term of this patent is extended or adjusted under 35 U.S.C. 154(b) by 268 days.

(21) Appl. No.: 10/623,329

(22) Filed: Jul. 18, 2003

(65) Prior Publication Data

US 2005/0013376 A1 Jan. 20, 2005

(51) Int. Cl.
*H04N 7/12* (2006.01)
(52) U.S. Cl. .................................. 375/240.24
(58) Field of Classification Search ........... 375/240.01, 375/240.08, 240.12, 240.24; H04N 7/12
See application file for complete search history.

(56) References Cited

U.S. PATENT DOCUMENTS

2003/0223495 A1 * 12/2003 Sun et al. .............. 375/240.12

* cited by examiner

*Primary Examiner*—Young Lee
(74) *Attorney, Agent, or Firm*—Christopher P. Maiorana, P.C.

(57) ABSTRACT

An apparatus including a first processing circuit and a second precessing circuit. The first processing circuit may be configured to generate a plurality of reconstructed samples in response to one or more macroblocks of an input signal. The second processing circuit may be configured to determine availability of intra 4×4 prediction modes for each luma sub-block of a current macroblock in response to available reconstructed samples adjacent to the current macroblock.

22 Claims, 10 Drawing Sheets

INTRA 4×4 MODES 3, 7 AND 8 AVAILABILITY DETERMINATION INTRA ESTIMATION AND COMPENSATION

FIELD OF THE INVENTION

The present invention relates to processing digital video generally and, more particularly, to a method and/or circuit for determining availability of intra estimation and/or intra compensation of intra 4×4 sample prediction modes 3, 7 and 8 as specified in subclause 8.3.1.2 of ISO/IEC 14496-10 AVC and ITU-T Rec. H.264.

BACKGROUND OF THE INVENTION

When a current block (or macroblock) is encoded/decoded in intra mode, a prediction block is formed based on adjacent samples from previously encoded/decoded and reconstructed blocks. The prediction block is subtracted from the current block prior to encoding. When the current block is decoded in intra mode, a prediction block is formed based upon samples from previously decoded and reconstructed blocks. The prediction block is added to the current block following decoding.

A prediction block for encoding/decoding luminance can be formed for each 4×4 sub-block of a macroblock or for the entire 16×16 macroblock. Conventional approaches restrict the availability of some modes when encoding 4×4 sub-blocks. Having alternative modes available for comparison when making an estimation decision can improve compression accuracy and efficiency.

It would be desirable to have a solution that would allow as many modes for intra prediction as possible for the number of samples available.

SUMMARY OF THE INVENTION

The present invention concerns an apparatus comprising a first processing circuit and a second precessing circuit. The first processing circuit may be configured to generate a plurality of reconstructed samples in response to one or more macroblocks of an input signal. The second processing circuit may be configured to determine availability of intra 4×4 prediction modes for each luma sub-block of a current macroblock in response to available reconstructed samples adjacent to the current macroblock.

The objects, features and advantages of the present invention include providing a method and/or circuit for determining availability of intra estimation and/or intra compensation of intra 4×4 sample prediction modes 3, 7 and 8 that may (i) allow modes 3, 7 and 8 to be valid more frequently than in conventional approaches, (ii) provide alternative modes for comparison when making estimation decisions, (iii) obtain more accurate compression, (iv) obtain more efficient compression and/or (v) base mode validation on samples used by each mode.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
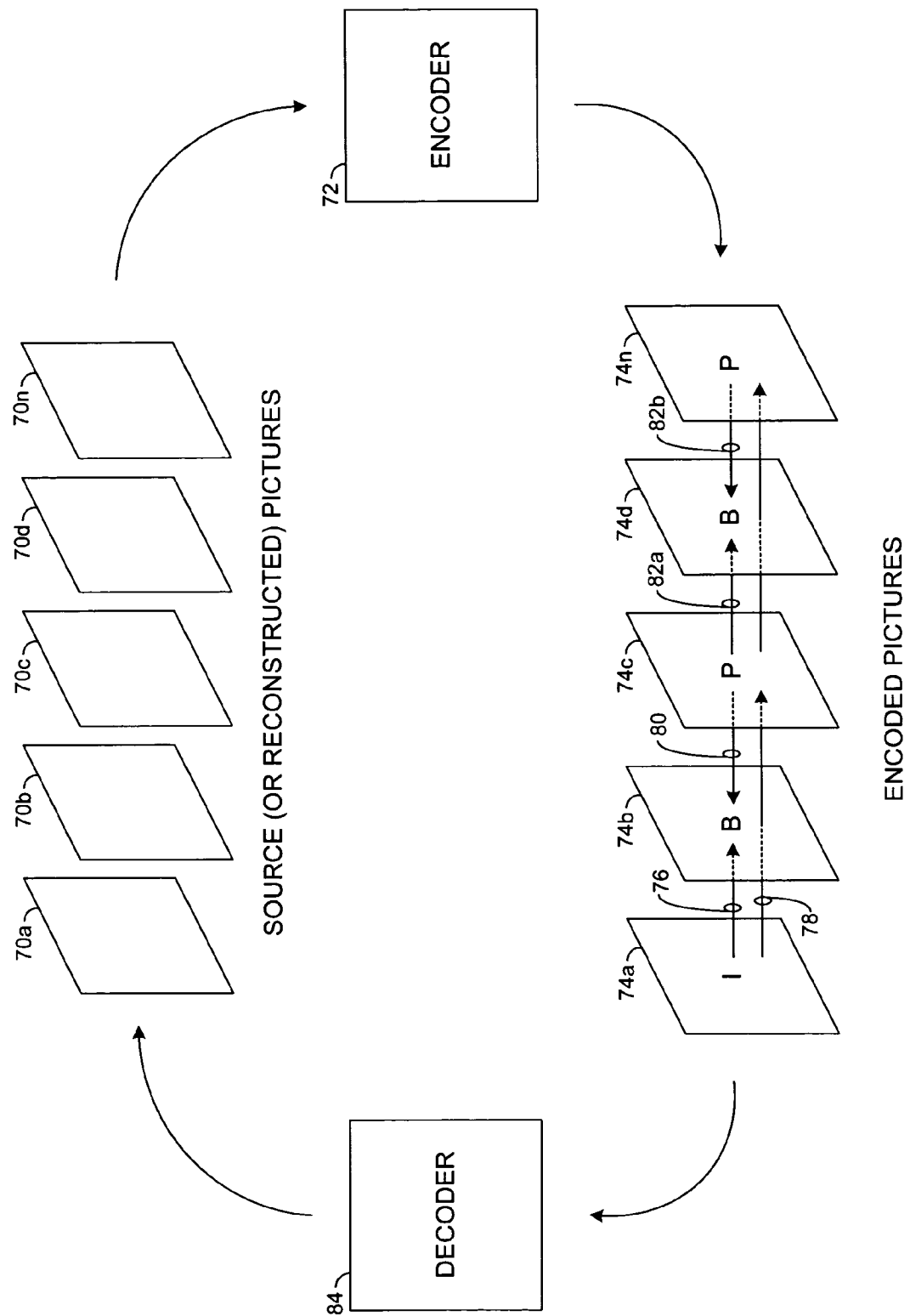
FIG. 1 is a block diagram illustrating encoding and decoding operations.

Referring to FIG. 1, a block diagram is shown illustrating encoding and decoding operations. In general, a data stream (e.g., a video stream) may comprise a series of source pictures 70a–n. The source pictures may also be referred to as images, frames, a group-of-pictures (GOP) or a sequence. The pictures generally comprise contiguous rectangular arrays of pixels (i.e., picture elements). Compression of digital video without significant quality degradation is usually possible because video sequences contain a high degree of: 1) spatial redundancy, due to the correlation between neighboring pixels, 2) spectral redundancy, due to correlation among the color components, 3) temporal redundancy, due to correlation between video frames, and 4) psycho-visual redundancy, due to properties of the human visual system (HVS). Video frames generally comprise three rectangular matrices of pixel data representing a luminance signal (e.g., luma Y) and two chrominance signals (e.g., chroma Cb and Cr) that correspond to a decomposed representation of the three primary colors (e.g., Red, Green and Blue) associated with each picture element. The most common format used in video compression standards is eight bits and 4:2:0 sub-sampling (e.g., the two chroma components are reduced to one-half the vertical and horizontal resolution of the luma component). However, other formats may be implemented to meet the design criteria of a particular application.

Each picture may comprise a complete frame of video (e.g., a frame picture) or one of two interlaced fields from an interlaced source (e.g., a field picture). The field picture generally does not have any blank lines between the active lines of pixels. For example, if the field picture is viewed on a normal display, the field picture would appear short and fat. For interlaced sequences, the two fields may be encoded together as a frame picture. Alternatively, the two fields may be encoded separately as two field pictures. Both frame pictures and field pictures may be used together in a single interlaced sequence. High detail and limited motion generally favors frame picture encoding. In general, field pictures occur in pairs (e.g., top/bottom, odd/even, field1/field2). The output of a decoding process for an interlaced sequence is generally a series of reconstructed fields. For progressive scanned sequences, all pictures in the sequence are frame pictures. The output of a decoding process for a progressive sequence is generally a series of reconstructed frames.

The source pictures 70a–n may be presented to an encoder 72. The encoder 72 may be configured to generate a series of encoded pictures 74a–n in response to the source pictures 70a–n, respectively. For example, the encoder 72 may be configured to generate the encoded pictures 74a–n using a compression standard (e.g., MPEG-2, MPEG-4, H.264, etc.). In general, encoded pictures may be classified as intra coded pictures (I), predicted pictures (P) and bi-predictive pictures (B). Intra coded pictures are generally coded without temporal prediction. Rather, intra coded pictures use spatial prediction within the same picture. For example, an intra coded picture is generally coded using information within the corresponding source picture (e.g., compression using spatial redundancy). An intra coded picture is generally used to provide a receiver with a starting point or reference for prediction. In one example, intra coded pictures may be used after a channel change and to recover from errors.

Predicted pictures (e.g., P-pictures or P-frames) and bi-predictive pictures (e.g., B-pictures or B-frames) may be referred to as inter coded. Inter coding techniques are generally applied for motion estimation and/or motion compensation (e.g., compression using temporal redundancy). P-pictures and B-pictures may be coded with forward prediction from references comprising previous I and P pictures. For example, the B-picture 74b and the P-picture 74c may be predicted using the I-picture 74a (e.g., as indicated by the arrows 76 and 78, respectively). The B-pictures may also be coded with (i) backward prediction from a next I or P-reference picture (e.g., the arrow 80) or (ii) interpolated prediction from both past and future I or P-references (e.g., the arrows 82a and 82b, respectively). However, portions of P and B-pictures may also be intra coded or skipped (e.g., not sent at all). When a portion of a picture is skipped, the decoder generally uses the associated reference picture to reconstruct the skipped portion with no error.

However, the concept of what particular pictures may reference what other particular pictures may be generalized in a particular compression standard (e.g., H.264). For example, P-pictures may reference temporally forward or backward. B-pictures may have similar forward or backward references. The restriction is generally not time, but rather how many frames are stored in a buffer so that the frames may be decoded in a different order than the frames are displayed. In one example, the frames may be referenced forward in time. In another example, the frames may be referenced backward in time (e.g., re-ordering the frames).

In one example, a B-frame may differ from a P-frame in that a B-frame may do interpolated prediction from any two reference frames. Both reference frames may be (i) forward in time, (ii) backward in time, or (iii) one in each direction. B-pictures can be, and are expected to often be, used as prediction references in H.264. In many cases an important distinction is between reference and non-reference frames.

The encoded pictures 74a–n may be presented to a decoder 84. The decoder 84 is generally configured to generate a series of reconstructed pictures corresponding to the source pictures 70a–n (e.g., images, frames, fields, etc.) in response to the encoded pictures. In one example, the decoder 84 may be implemented within the encoder 72 and the reconstructed pictures may be used in the prediction operations of the encoding process.

Figure 2:
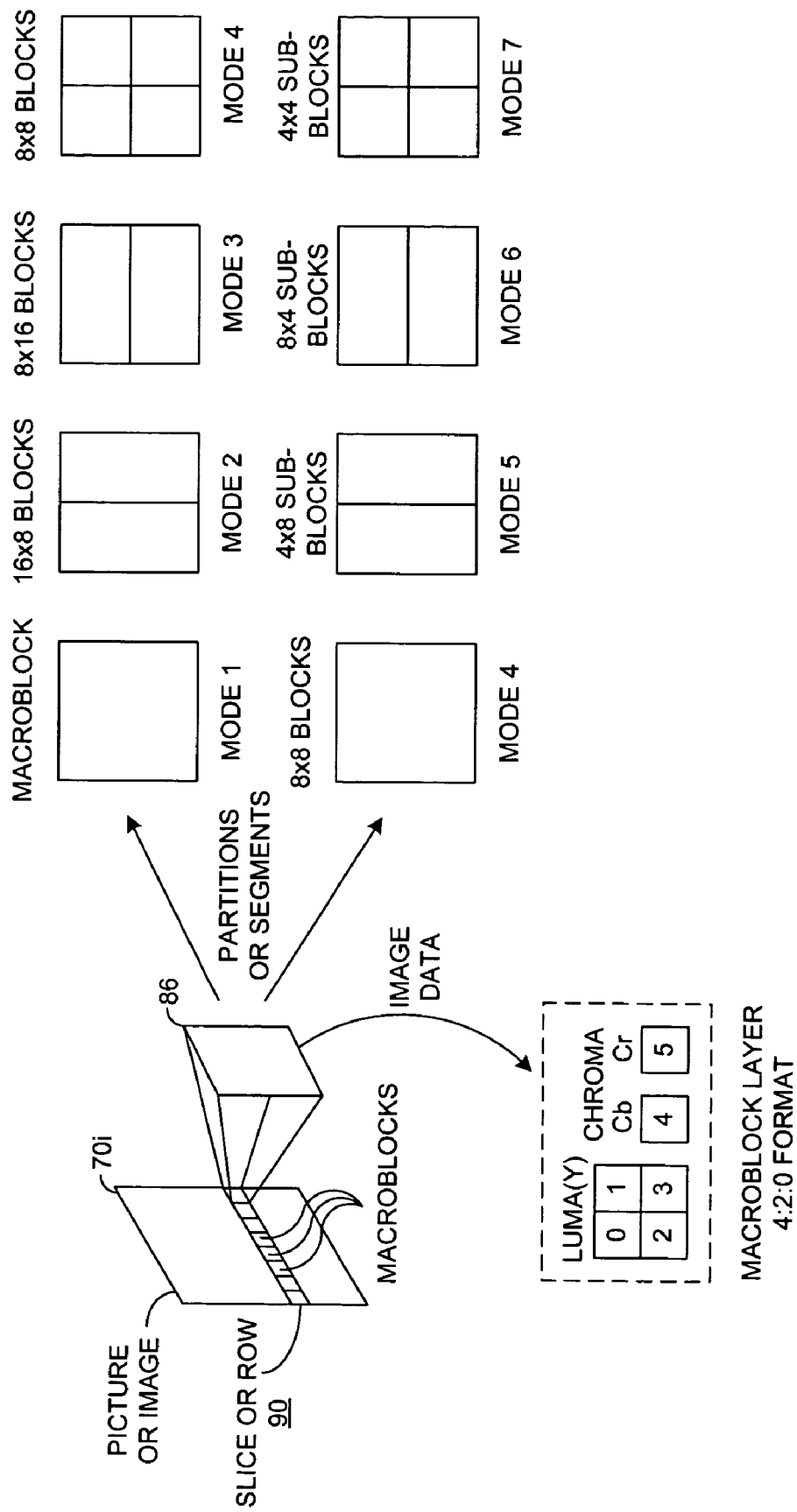
FIG. 2 is a block diagram illustrating partitions or segments of pictures.

Referring to FIG. 2, a block diagram is shown generally illustrating partitions or segments of pictures. In general, a picture (e.g., an image, a frame, a field, etc.) 70i may be divided (e.g., segmented, partitioned, etc.) into a number of macroblocks 86. The macroblocks generally comprise an array of pixels having vertical and horizontal dimensions of equal size (e.g., 32×32, 16 ×16, etc). The macroblocks generally comprise luminance data (e.g., luma Y) and chrominance data (e.g., blue chroma Cb and red chroma Cr). In one example, the luminance data may have a resolution that is twice that of the chrominance data (e.g., a 4:2:0 format).

The macroblocks 86 may be grouped in a number of slices 90. The slices 90 may comprise an arbitrary number of macroblocks 86. The slices 90 generally run from left to right and may comprise an entire row of the picture 70i. However, a slice 90 may comprise less than or more than an entire row of macroblocks 86 (e.g., H.264 compliant). In one example, a slice 90 may be defined as a particular number of macroblocks 86 grouped together. For broadcast profiles, the macroblocks 86 in a slice 90 are generally consecutive macroblocks in raster scan order. However, for streaming and/or video-conferencing applications, a map may be sent identifying which scattered macroblocks are grouped together in a slice. A compression standard (e.g., H.264) may also provide an option of using macroblocks or macroblock pairs. A macroblock pair comprises two macroblocks located one above the other. When macroblock pairs are used, a slice or row generally comprises macroblock pairs rather than macroblocks.

In one example, the macroblock 86 may be implemented as a 16×16 block. The macroblock 86 may be encoded in an inter prediction mode (e.g., compression based upon temporal redundancy) or an intra prediction mode (e.g., compression based upon spatial redundancy). In the inter prediction mode, each 16×16 macroblock 86 may be predicted with a single 16×16 vector (e.g., mode 1). Alternatively, the macroblock 86 may be segmented into two 16×8 blocks (e.g., mode 2) or two 8×16 blocks (e.g., mode 3), in which case two motion vectors may be generated for predicting the macroblock 86. The macroblock 86 may also be segmented into four 8×8 blocks (e.g., mode 4), in which case four motion vectors may be generated for the macroblock 86. When the macroblock 86 is segmented into the four 8×8 blocks (e.g., mode 4), each 8×8 block may be optionally further segmented into two 4×8 sub-blocks (e.g., mode 5), two 8×4 sub-blocks (e.g., mode 6) or four 4×4 sub-blocks (e.g., mode 7). An encoder generally decides which "mode" to use for encoding each macroblock 86. For example, an error score may be computed based on a closeness of match determination for each mode, with the modes that use more vectors being penalized (e.g., by increasing the respective error score) because of the additional bits that it will take to encode the motion vectors.

When a block or macroblock is to be encoded in the intra prediction mode, a prediction block is generally formed based upon previously decoded and reconstructed blocks. In an encoder, the prediction block is generally subtracted from the current block prior to encoding. In a decoder, the prediction block is generally added to the current block prior to filtering. For luminance (or luma) samples, the prediction block may be formed for either each 4×4 sub-block in the macroblock or for the entire 16×16 macroblock. When each 4×4 luma block is to be predicted, any available one of nine prediction modes may be used for each 4×4 luma block. When the entire macroblock (e.g., a 16×16 luma block) is to be encoded, any of four available prediction modes may be used.

Figure 3:
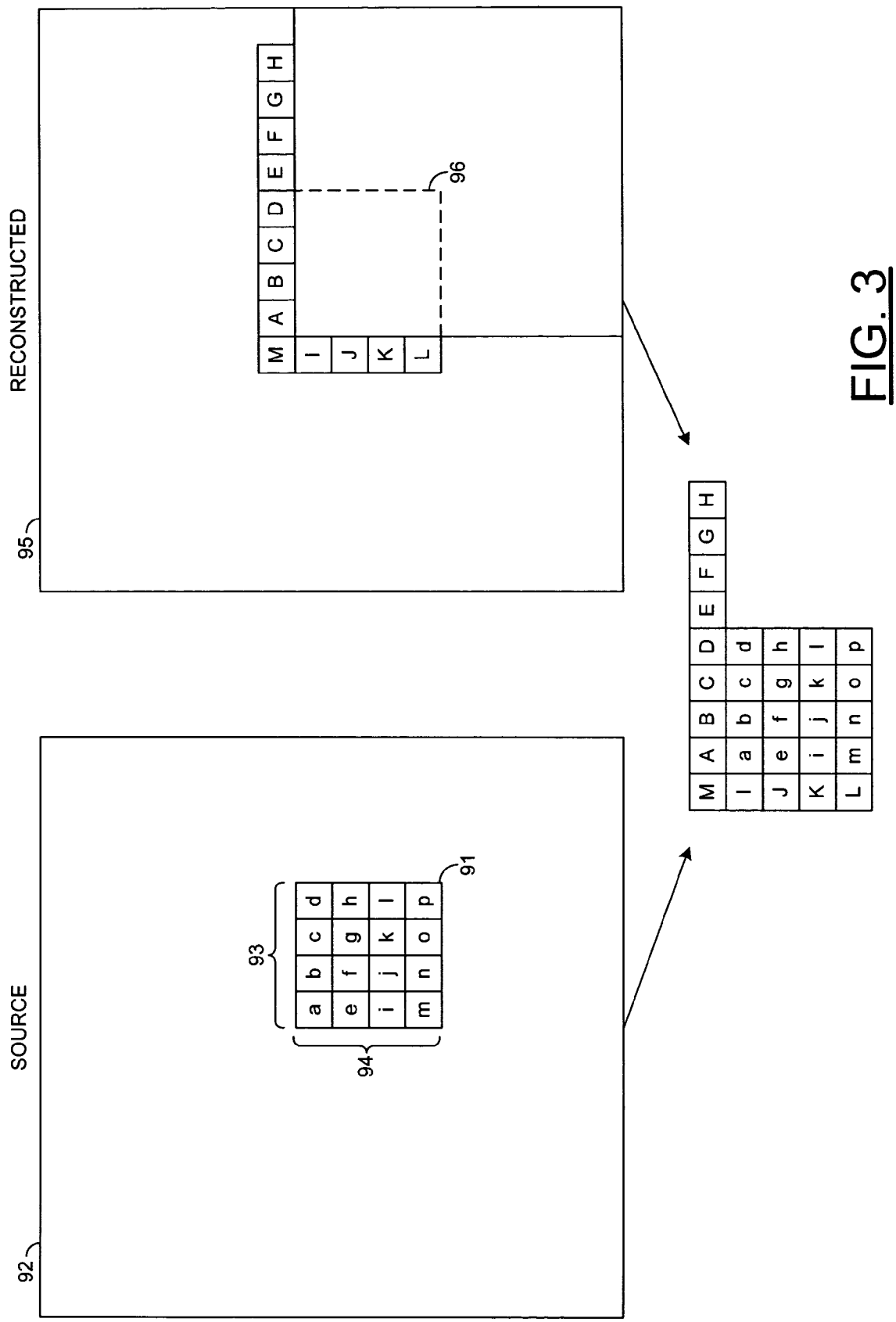
FIG. 3 is a diagram generally illustrating an example intra 4×4 prediction operation.

Referring to FIG. 3, a diagram illustrating an intra prediction operation for a 4×4 luma block is shown. For each 4×4 luma block 91 to be predicted in a current (or source) slice 92, a top edge 93 and a left edge 94 are generally determined. The top edge 93 and the left edge 94 of the 4×4 luma block are used to determine whether reconstructed samples in a reconstructed slice 95 that are above and to the left of the 4×4 luma block (e.g., samples A–M) have been encoded and reconstructed. If the reconstructed samples A–M are available in the encoder and decoder, a prediction block 96 may be generated using the reconstructed samples A–M. However, not all of the reconstructed samples A–M may be available within the current slice. In general, only previously encoded/decoded samples within a current slice are considered available for intra prediction in order for slices to be independently decoded.

Specifically, not all of the samples A–M may be available within the current reconstructed slice 95. In general, only previously encoded/decoded samples within a current reconstructed slice are considered available for intra prediction in order for slices to be independently decoded. In addition, some modes of operation (e.g., a constrained intra mode) may consider only macroblocks coded in an intra prediction mode within a slice to be available (e.g., for the constrained intra mode only other intra macroblocks within the slice are considered available, inter coded macroblocks are considered unavailable). Also, in H.264, a slice may not always be independently decoded from other slices. For example, a loop (or deblocking) filter may operate between slices. However, the decoding process for pixels, up to but not including the deblocking filter portion of the decoding process, may be independently decoded in the various slices. In general, intra prediction is performed on the decoded samples prior to the deblocking filter process.

In general, adjacent (or neighboring) samples refers to reconstructed samples in a line directly above or to the left of the current block. For field coded pictures and frame coded pictures the meaning of neighboring/adjacent is very simple: vertically adjacent samples are in the line above in the picture (which may be either a frame or a field), and horizontally adjacent samples are the line to the left in the picture (which may be either a frame or a field). However, with macroblock adaptive field/frame (MB-AFF) coded pictures (e.g., particularly when using constrained intra prediction), the samples considered to be adjacent for intra prediction may depend on the mode of the current macroblock. For example, when processing a frame macroblock, the adjacent samples generally comprise samples that are adjacent to the current block with the picture samples arranged as a frame. When processing a field macroblock, the adjacent samples generally comprise the samples that are adjacent to the current block with the picture samples arranged as the same parity field as the current macroblock.

In one example, with MB-AFF coding and constrained intra prediction, if a left adjacent macroblock pair are coded with one FRAME macroblock intra predicted and the other FRAME macroblock not intra predicted (e.g., inter predicted), the neighboring samples I–L may or may not be available for prediction for the FIELD macroblocks in the current macroblock pair. In another example, when a field macroblock pair is to the left of a current frame macroblock pair, if one of the left macroblocks is not available (e.g., due to being non-intra predicted), all of the samples I–L are generally not available for both macroblocks in the current macroblock pair. In general, the present invention provides for separately determining the availability of the individual adjacent samples (e.g., A–L).

Figure 4:
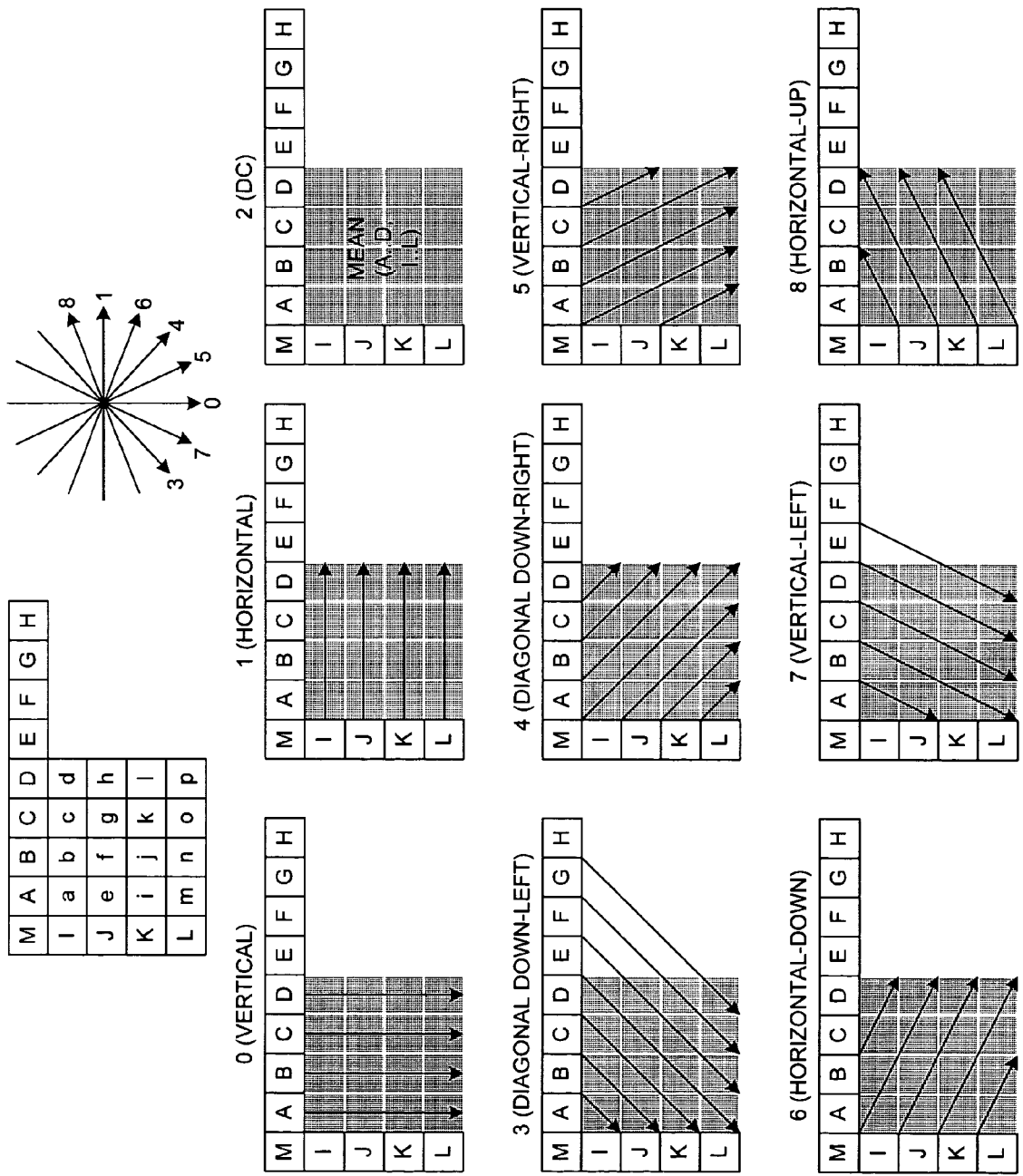
FIG. 4 is a diagram illustrating various intra 4×4 prediction modes.

Referring to FIG. 4, a diagram illustrating various intra 4×4 prediction modes is shown. When intra 4×4 prediction is available, the prediction block for each 4×4 sub-block may be formed using one of the nine prediction modes depending upon which previously encoded blocks are available. In a conventional process, the particular modes used for generating the prediction blocks are determined based upon all samples from adjacent encoded blocks being available. In general, nine optional intra 4×4 prediction modes (e.g., modes 0–8) may be used to form the luma 4×4 prediction block 96. The prediction block 96 is generally formed by copying particular ones of the samples A–M into positions in the prediction block (e.g., a–p) based upon each particular intra prediction mode. The arrows generally indicate the direction in which the samples A–M are copied in each prediction mode.

The encoder generally selects the prediction mode for each 4×4 luma block that produces a prediction block 96 that most closely resembles the current block 91. For example, the encoder may select the mode that minimizes a difference (or residual) between the predicted block 96 and the block 91 to be encoded. In one example, a measurement (e.g., sum of absolute differences (SAD)) may be determined to indicate the prediction error.

Figure 5:
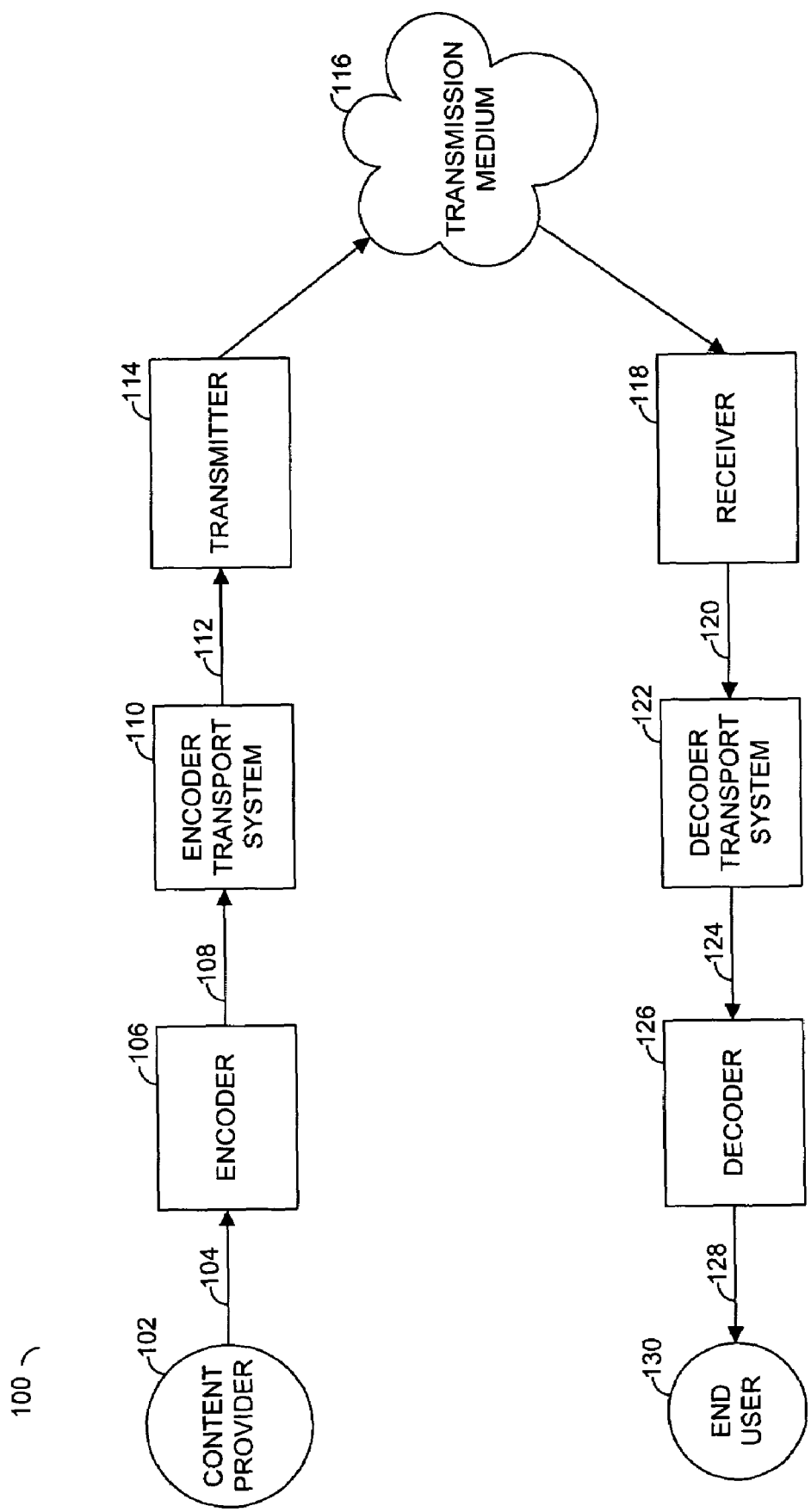
FIG. 5 is a block diagram illustrating various components of a compressed video system.

Referring to FIG. 5, a block diagram of a system 100 is shown. In general, a content provider 102 presents video image, audio or other data 104 to be compressed and transmitted to an input of an encoder 106. The compressed data 108 from the encoder 106 may be presented to an encoder transport system 110. An output of the encoder transport system 110 generally presents a signal 112 to a transmitter 114. The transmitter 114 transmits the compressed data via a transmission medium 116. The content provider 102 may comprise a video broadcast, DVD, or any other source of video data stream. The transmission medium 116 may comprise a broadcast, cable, satellite, network, DVD, hard drive, or any other medium implemented to carry, transfer, and/or store a compressed bitstream.

On a receiving side of the system 100, a receiver 118 generally receives the compressed data bitstream from the transmission medium 116. The receiver 118 presents a bitstream 120 to a decoder transport system 122. The decoder transport system 122 generally presents the bitstream via a link 124 to a decoder 126. The decoder 126 generally decompresses the data bitstream and presents the data via a link 128 to an end user 130. The end user 130 may comprise a television, monitor, computer, projector, hard drive, or any other medium implemented to carry, transfer, present, display and/or store an uncompressed bitstream.

Figure 6:
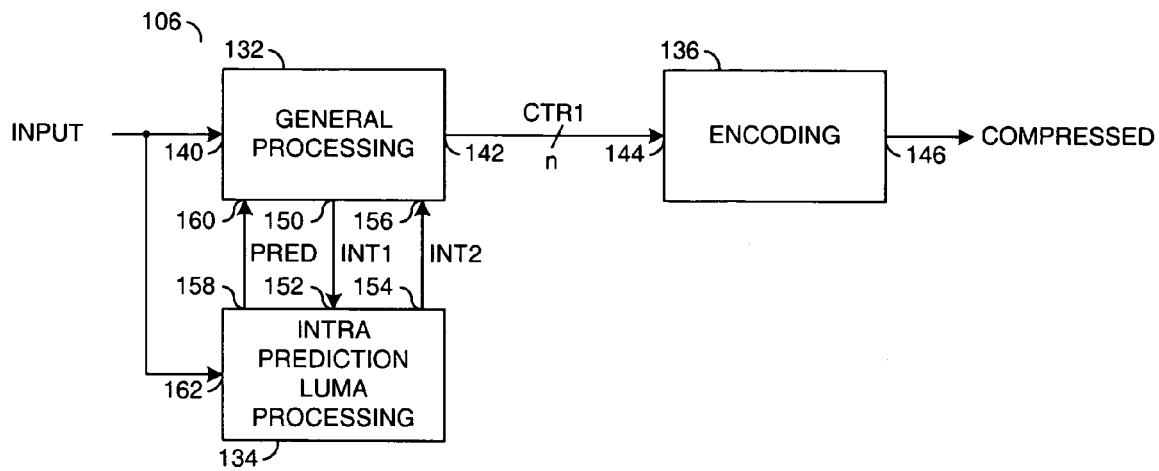
FIG. 6 is a block diagram illustrating an encoder in accordance with a preferred embodiment of the present invention.

Referring to FIG. 6, a block diagram illustrating an encoder 106 in accordance with a preferred embodiment of the present invention is shown. The encoder 106 may be implemented, in one example, as an H.264 compliant encoder. The encoder 106 generally comprises a processing block 132 and a processing block 134. The encoder 106 may also comprise an encoding block 136. The processing block 132 may be implemented as a general processing block. The processing block 134 may be implemented as an intra prediction luma processing block.

The general processing block 132 may have an input 140 that may receive a signal (e.g., INPUT). The signal INPUT generally comprises an uncompressed digital video signal comprising a series of pictures (e.g., frames, fields, etc.). Each picture generally comprises a representation of a digital video signal at a particular time. The general processing block 132 may be configured to generate a plurality of macroblocks from each picture. The general processing block 132 may also have an output 142 that may present one or more signals (e.g., CTR1) to an input 144 of the encoding circuit 136.

The encoding circuit 136 may have an output 146 that may present a signal (e.g., COMPRESSED). The signal COMPRESSED may be a compressed and/or encoded bitstream, such as an H.264 compliant digital video bitstream. In one example, the encoding circuit 136 may be configured to perform entropy coding. The circuit 136 may be further configured to provide serialization (e.g., zig-zag scan) and re-ordering of the transformed and quantized pictures.

The general processing circuit 132 may have an output 150 that may present one or more signals (e.g., INT1) to an input 152 of the intra prediction luma processing block 134. Similarly, the intra prediction luma processing block 134 may have an output 154 that may present a signal (e.g., INT2) to an input 156 of the general processing block 132, an output 158 that may present a signal (e.g., PRED) to an input 160 of the general processing block 132 and an input 162 that may receive the signal INPUT. The signal INT1 may comprise, in one example, previously encoded/decoded and reconstructed samples of the pictures in the signal INPUT. The signal INT2 may comprises, in one example, mode information regarding prediction samples generated by the block 134. The signal PRED generally comprises one or more prediction samples related to each picture.

Figure 7:
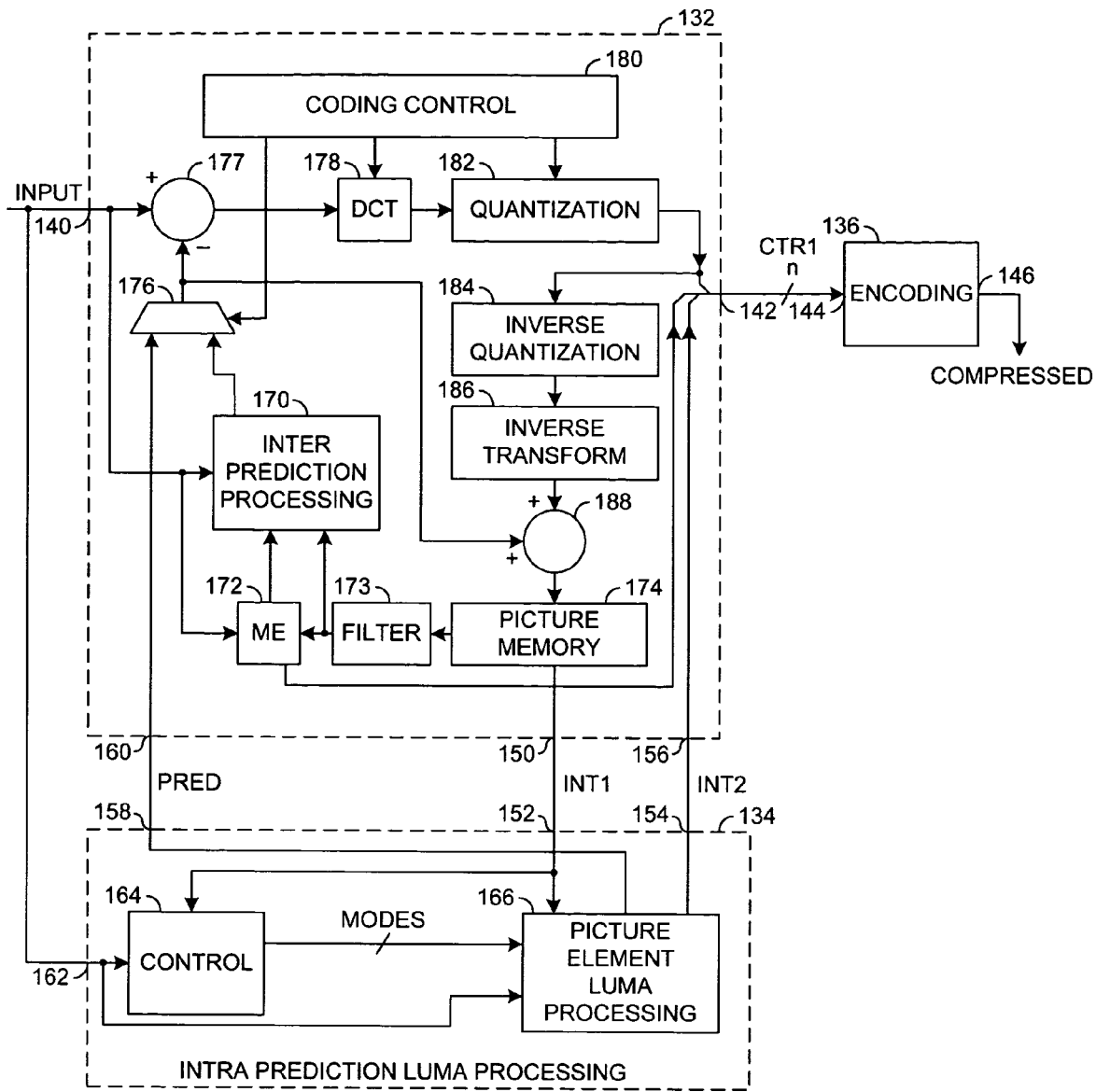
FIG. 7 is a more detailed diagram of the encoder of FIG. 6.

Referring to FIG. 7, a more detailed diagram of the encoder 106 of FIG. 6 is shown. The intra prediction processing block 134 generally comprises a block (or circuit) 164 and a block (or circuit) 166. The circuit 164 may be implemented, in one example, as a control circuit. The circuit 166 may be implemented as a picture element luma processing block. The circuit 164 may be configured to determine available intra prediction modes in response to the signals INPUT and INT1. In particular, the circuit 164 may be configured to determine availability of reconstructed samples A–M for each 4×4 luma block to be intra predicted. The circuit 164 may be configured to generate a signal (e.g., MODES) in response to the signals INPUT and INT1. In one example, the signal MODES may be implemented as one or more individual control signals. Alternatively, the signal MODES may be implemented as a multibit signal, where each bit may be used as a control signal. In one example, the signal MODES may be configured to indicate availability of intra 4×4 prediction sample modes 3, 7 and 8.

The circuit 166 may be configured to generate prediction blocks for each 4×4 luma block to be encoded. The circuit 166 may be configured to receive the signals INPUT, INT1 and MODES. The circuit 166 may be configured to generate the signals INT2 and PRED in response to the signals INPUT, MODES and INT1.

The circuit 132 generally comprises a block (or circuit) 170, a block (or circuit) 172, a block (or circuit) 173, a block (or circuit) 174, a block (or circuit) 176, a block (or circuit) 177, a block (or circuit) 178, a block (or circuit) 180, a block (or circuit) 182, a block (or circuit) 184, a block (or circuit) 186 and a block (or circuit) 188. The circuit 170 may be implemented as an inter prediction processing circuit. The circuit 172 may be implemented as a motion estimation circuit. The circuit 173 may be implemented as a deblocking (or loop) filter. The circuit 174 may be implemented as a picture memory circuit. The circuit 176 may be implemented as a selection circuit, such as a 2:1 multiplexer. The circuit 177 may be implemented as a summing circuit. The circuit 178 may be implemented as a transform circuit. In one example, the circuit 178 may be configured to perform an 4×4 integer transform or a discrete cosine transform (DCT).

The circuit 180 may be implemented as a control circuit. The circuit 182 may be implemented as a quantization circuit. The circuit 184 may be implemented as an inverse quantization circuit. The circuit 186 may be implemented as an inverse transform circuit. The circuit 188 may be implemented as a summing circuit.

An output of the quantization circuit 182, an output of the motion estimation circuit 172, an output of the inter processing circuit 170 and the signal INT2 may be presented as the signal CTR1 at the output 142. The inverse quantization circuit 184 is generally configured to reverse the quantization process performed by the quantization circuit 182. The inverse transform circuit 186 is generally configured to reverse the transformation process (e.g., DCT or 4×4 integer) performed by the circuit 178. The inverse transform circuit 186 may also be referred to as an inverse DCT block or an IDCT block.

The signal INPUT may be presented to the inter prediction processing block 170, the motion estimation block 172 and the summing block 177. The summing block 177 may mathematically combine the signal INPUT with either (i) an output of the inter prediction processing block 170 or (ii) the signal PRED from the block 134. The selection may respond to a signal provided by the control circuit 180. The signal INPUT may be compressed with the transform circuit 178. The transform circuit 178 may translate the macroblocks in the signal INPUT from time domain frames to frequency domain frames. The quantization block 182 may reduce the number of bits in a number of coefficients representing the signal INPUT. The encoding block 136 may provide entropy coding (e.g., Huffman coding, binary arithmetic coding, context adaptive binary arithmetic coding or CABAC, etc.) to implement a lossless compression having frequent values represented in fewer bits.

The inverse quantization circuit 184 and the inverse transform circuit 186 may be configured to decode the encoded macroblocks. The summing block 188 may provide a mathematical operation to sum the decoded macroblocks with the predicted macroblocks to form reconstructed macroblocks. By reconstructing the macroblocks, the processing block 132 generally ensures that the prediction processing is based upon the same reference as would be available during decoding (e.g., reduces drift).

Figure 8:
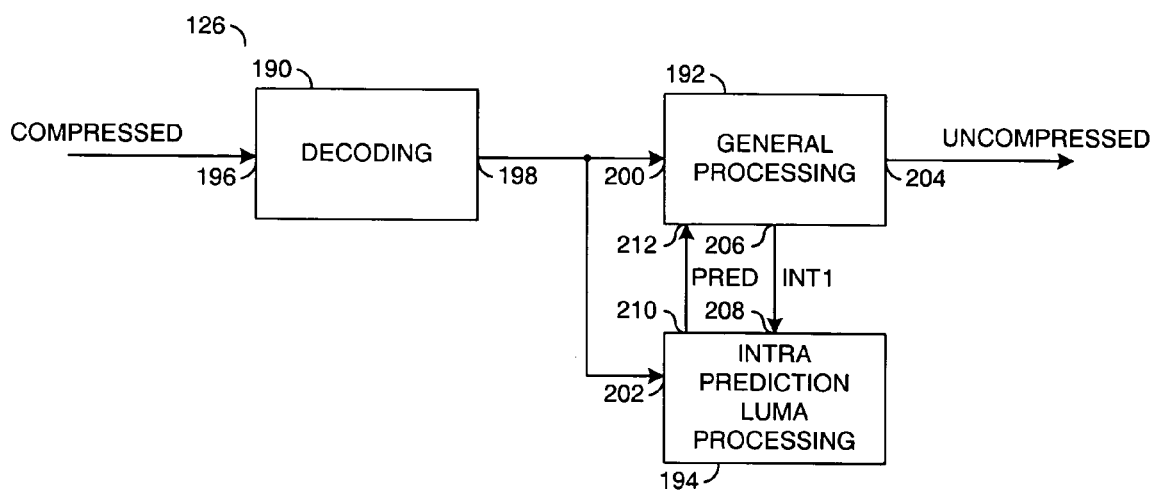
FIG. 8 is a block diagram illustrating a decoder in accordance with a preferred embodiment of the present invention.

Referring to FIG. 8, a block diagram illustrating a decoder 126 in accordance with a preferred embodiment of the present invention is shown. The decoder 126 may be implemented, in one example, as an H.264 compliant decoder. The decoder 126 generally comprises a decoding block 190, a processing block 192 and a processing block 194. The decoding block 190 may be implemented as an entropy decoding block. The decoding block 190 may be further configured to re-order and deserialize information contained in the signal COMPRESSED. The processing block 192 may be implemented as a general processing block. The processing block 194 may be implemented as an intra prediction luma processing block. In one example, the block 194 may be implemented similarly to the block 134 of the encoder 106 (described above in connection with FIGS. 6 and 7).

The decoding block 190 may have an input 196 that may receive the signal COMPRESSED and an output 198 that may present a number of coefficients to (i) an input 200 of the circuit 192 and (ii) an input 202 of the circuit 194. The coefficients generally represent a digital video signal comprising a series of pictures (e.g., frames, fields, etc.). Each picture generally comprises a representation of a digital video signal at a particular time. The general processing block 192 may be configured to generate a plurality of reconstructed macroblocks from each picture. The general processing block 192 may also have an output 204 that may present a signal (e.g., UNCOMPRESSED). The signal UNCOMPRESSED may comprise a reconstruct digital video signal.

The general processing circuit 192 may have an output 206 that may present one or more signals (e.g., INT1) to an input 208 of the intra prediction luma processing block 194. Similarly, the intra prediction luma processing block 194 may have an output 210 that may present a signal (e.g., PRED) to an input 212 of the general processing block 192. The signal INT1 may comprise, in one example, previously encoded/decoded and reconstructed samples of the pictures reconstructed from the signal COMPRESSED. The signal PRED generally comprises one or more prediction samples related to each picture.

Figure 9:
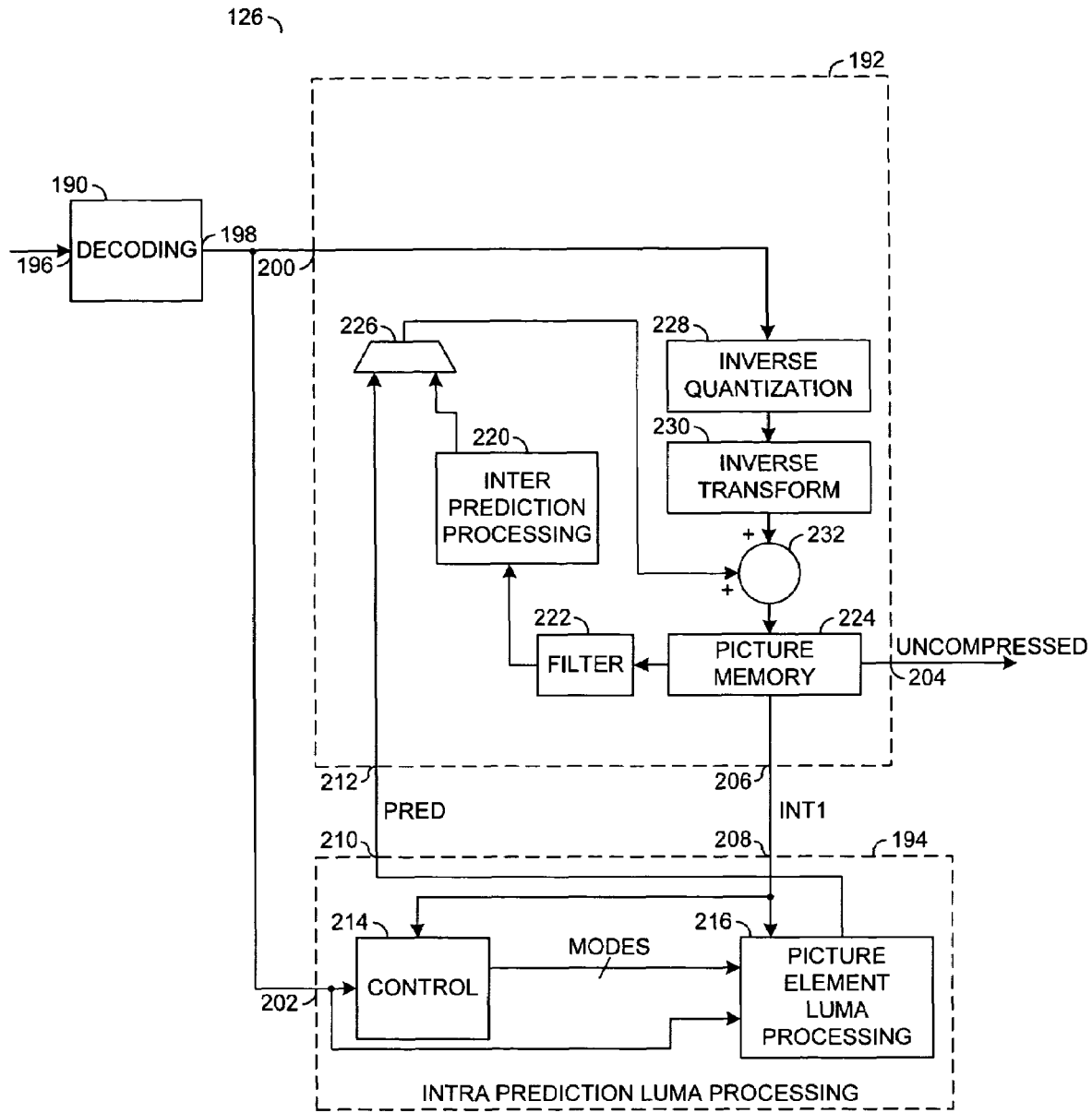
FIG. 9 is a more detailed diagram of the decoder of FIG. 8.

Referring to FIG. 9, a more detailed diagram of the decoder 126 of FIG. 8 is shown. The intra prediction luma processing block 194 generally comprises a block (or circuit) 214 and a block (or circuit) 216. The circuit 214 may be implemented, in one example, as a control circuit. The circuit 216 may be implemented as a picture element luma processing block. The circuit 214 may be configured, in one example, to determine availability of intra 4×4 prediction sample modes (e.g., modes 3, 7 and 8) in response to the signals INPUT and INT1. In particular, the circuit 214 may be configured to determine availability of reconstructed samples used in modes 3, 7 and 8 for each 4×4 luma block intra prediction. The circuit 214 may be configured to generate a signal (e.g., MODES) in response to the signals INPUT and INT1. In one example, the signal MODES may be implemented as one or more individual control signals. Alternatively, the signal MODES may be implemented as a multibit signal, where each bit may be used as a control signal. In one example, the signal MODES may be configured to indicate availability of intra 4×4 prediction sample modes 3, 7 and 8 as defined in the H.264 standard.

The circuit 216 may be configured to generate prediction blocks for each 4×4 luma sub-block to be decoded. The circuit 216 may be configured to receive the signals INPUT, INT1 and MODES. The circuit 216 may be configured to generate the signal PRED in response to the signals INPUT, MODES and INT1.

The circuit 192 generally comprises a block (or circuit) 220, a block (or circuit) 222, a block (or circuit) 224, a block (or circuit) 226, a block (or circuit) 228, a block (or circuit) 230, and a block (or circuit) 232. The circuit 220 may be implemented as an inter prediction processing circuit. The circuit 222 may be implemented as a filter circuit. In one example, the circuit 222 may be configured as a deblocking filter. The circuit 224 may be implemented as a picture memory circuit. The circuit 226 may be implemented as a selection circuit, such as a 2:1 multiplexer. The circuit 228 may be implemented as an inverse quantization circuit. The circuit 230 may be implemented as an inverse transformation circuit. In one example, the circuit 230 may be configured to perform an inverse 4×4 integer transform or a inverse discrete cosine transform (IDCT). The circuit 232 may be implemented as a summing circuit.

An output of the decoding circuit 190 may be presented to an input of the inverse quantization circuit 228. The inverse quantization circuit 228 is generally configured to reverse the quantization process performed when the signal COMPRESSED was encoded. An output of the circuit 228 may be presented to an input of the inverse transform circuit 230. The inverse transform circuit 230 is generally configured to reverse the transformation process (e.g., DCT or 4×4 integer) performed when the signal COMPRESSED was encoded.

An output of the inverse transform circuit 230 may be presented to the summing circuit 232. The summing block 232 may be configured to mathematically combine the output of the inverse transform circuit 230 (e.g., decoded macroblocks) with predicted blocks from either (i) an output of the inter prediction processing block 220 or (ii) the signal PRED from the block 194. An output (e.g., decoded and reconstructed macroblocks) of the summing circuit 232 is generally presented to the picture memory 224. The memory 224 may present the reconstructed macroblocks (i) to the circuit 192 in the signal INT1 and (ii) to the filter block 222. The filter 222 may be configured to present filtered reconstructed macroblocks as references to the inter prediction processing block 220.

Figure 10:
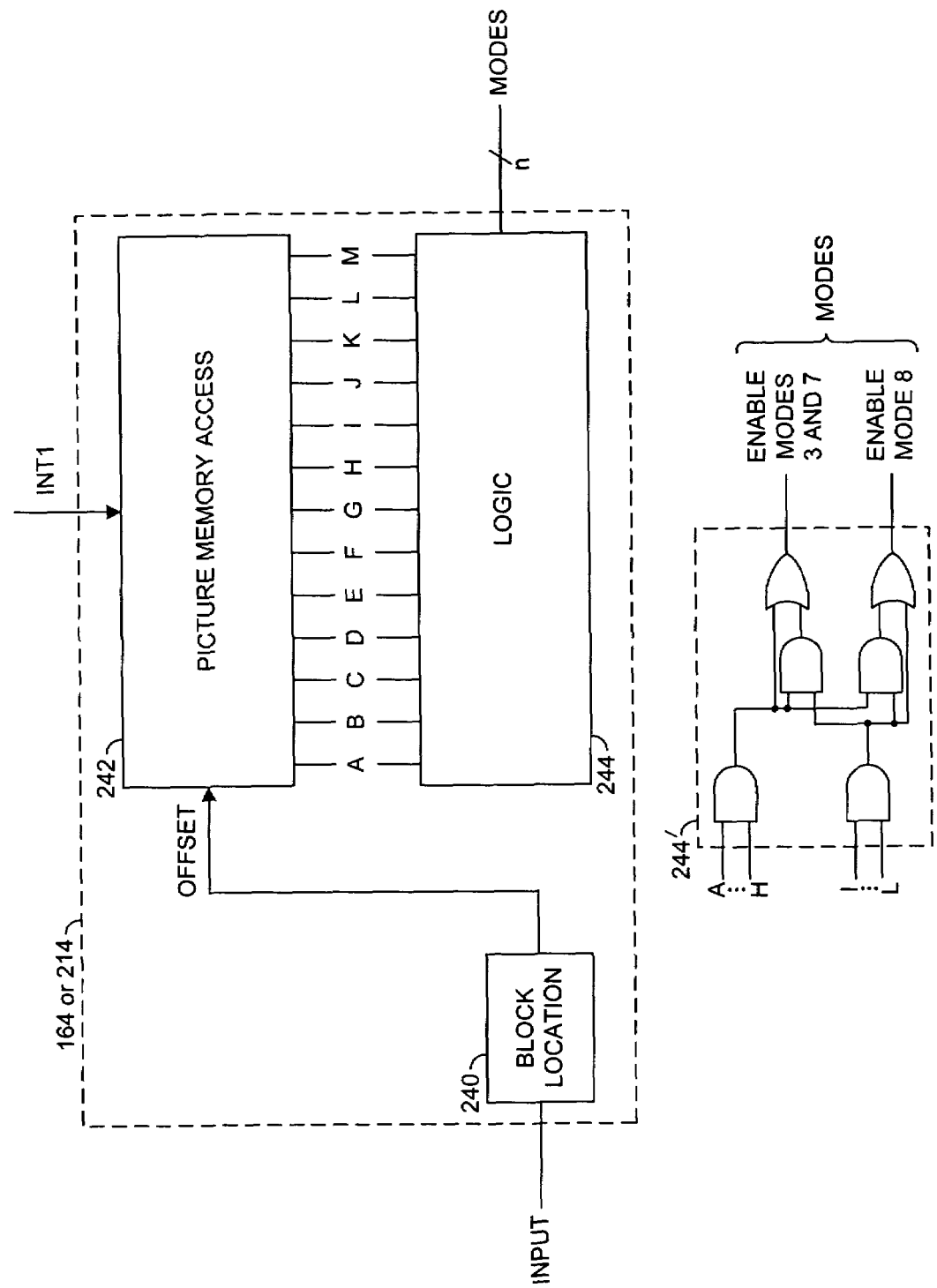
FIG. 10 is a more detailed block diagram illustrating an example control circuit of FIGS. 7 and 9.

Referring to FIG. 10, a more detailed block diagram illustrating an example implementation of the control blocks 164 and 214 of FIGS. 6 and 8 is shown. The control blocks 164 and 214 may comprise, in one example, a block (or circuit) 240, a block (or circuit) 242 and a block (or circuit) 244. The block 240 may be implemented as a block location detection circuit. The block 242 may be implemented as a picture memory access block. The block 244 may be implemented as a logic block. The block 240 may have an output that may present a signal (e.g., OFFSET) to an input of the block 242. The signal OFFSET may comprise, in one example, coordinates within the current slice of an upper left corner of a current 4×4 luma sub-block to be intra predicted. The circuit 240 may be configured to determine the position of the current luma sub-block to be encoded/decoded within the current slice. For example, the circuit 240 may be configured to determine the X,Y coordinates of the upper left corner of the current 4×4 luma sub-block.

The circuit 242 may be configured to determine the availability of previously encoded/decoded and reconstructed samples for prediction of the current sub-block (e.g., as illustrated in FIG. 3) in response to the signal OFFSET. In general, the circuit 242 may be configured to examine the picture memory 174 or 224 for the availability of the reconstructed samples adjacent to the current luma sub-block (e.g., represented by the signal INT1). The circuit 242 may be configured to generate a number of signals representing the available samples (e.g., A–M) in response to the signals OFFSET and INT1. In one example, the signals A–M may be configured to present the corresponding sample for each 4×4 luma sub-block of the current macroblock. Alternatively, the circuit 242 may be configured to retrieve the available reconstructed samples A–M from the picture memory 174 or 224. In one example, the circuit 242 may be configured to provide the available reconstructed samples A–M to the circuit 216 for use in generating the prediction block.

The circuit 244 may be configured to generate the signal MODES in response to the signals A–M received from the circuit 242. In one example, the circuit 244 may be implemented as combinational logic (e.g., in an application specific integrated circuit or ASIC) or as a sequence of computer executable instructions (e.g., a software implementation). A circuit 244' is shown illustrating an example circuit 244 configured to logically combine the signals A–M to determine availability of intra 4×4 prediction modes 3, 7 and 8 for the current luma sub-block. For example, the circuit 244 may be configured to generate a control signal that enables modes 3 and 7 in response to either the samples A–H or the samples A–L being available.

The circuit 244 may also be configured to generate a signal that enables mode 8 in response to the samples A–L or the samples I–L being available.

Figure 11:
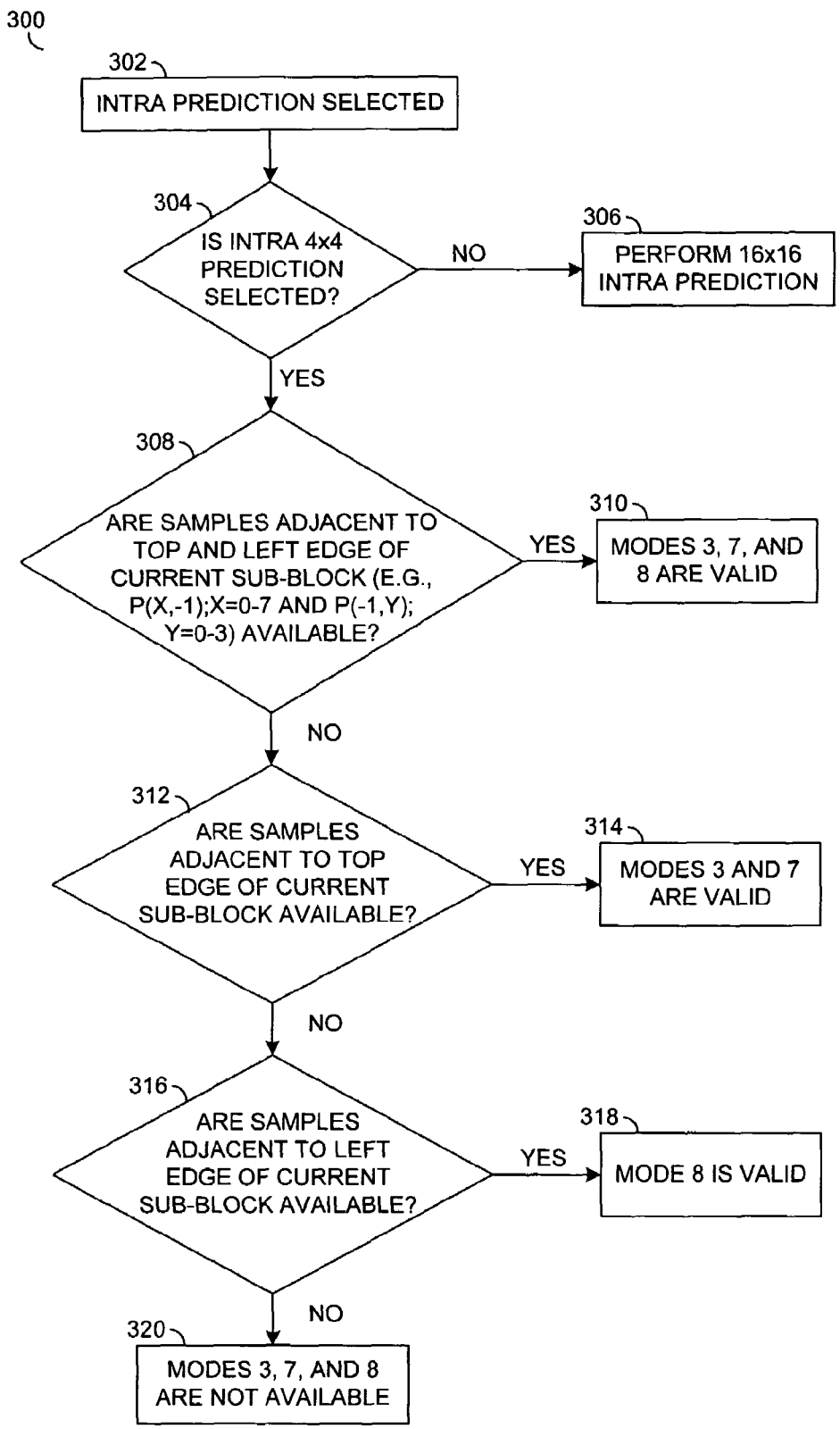
FIG. 11 is a flow diagram illustrating a mode enablement process in accordance with a preferred embodiment of the present invention.

Referring to FIG. 11, a flow diagram 300 illustrating an example intra prediction operation in accordance with a preferred embodiment of the present invention is shown. When intra prediction is selected (e.g., the block 302), a determination may be made whether intra 4×4 prediction is to be performed (e.g., the block 304). When intra 4×4 prediction is not selected, 16×16 intra prediction is performed (e.g., the block 306). When intra 4×4 prediction is to be performed, the current slice is generally checked to determine whether reconstructed samples from a macroblock adjacent to a top edge of the current sub-block (e.g., samples P(x,−1), where x=0−7) and samples for a macroblock adjacent to a left edge of the current sub-block (e.g., samples P(−1,y), where y=0−3) are available. When the samples along both the top and left edges of the current sub-block are available, appropriate control signals may be generated to enable (or indicate availability of) modes 3, 7 and 8 for intra 4×4 prediction (e.g., the blocks 308 and 310). When the samples adjacent to the top edge of the current sub-block are available and the samples adjacent to the left edge of the current sub-block are not available, appropriate control signals may be generated to enable (or indicate availability of) modes 3 and 7 (e.g., the blocks 312 and 314). When the samples adjacent to the left edge are present and the samples adjacent to the top edge are not, appropriate control signals may be generated to enable (or indicate availability of) mode 8 (e.g., the blocks 316 and 318). Otherwise, modes 3, 7 and 8 are not generally available (e.g., the block 320).

When intra 4×4 prediction mode 3 (e.g., diagonal down-left) is available (e.g., at least samples P(x,−1), where x=0 . . . 7, are available), the values of the prediction samples PRED(x,y), with x,y=0 . . . 3 may be generated as follows:
For x=3 and y=3, $$PRED(x,y)=(P(6,-1)+3*P(7,-1)+2)/4$$

Otherwise, $$PRED(x,y)=(P(x+y,-1)+2*P(x+y+1,-1)+P(x+y+2,-1)+2)/4.$$

When intra 4×4 prediction mode 7 (e.g., vertical-left) is available (e.g., at least samples P(x,−1), where x=0 . . . 7, are available), the values of the prediction samples PRED(x,y), with x,y=0 . . . 3 may be generated as follows:

For y=0 or y=2, $$PRED(x,y)=(P(x+(y/2),-1)+P(x+(y/2)+1,-1)+1)/2$$

Otherwise, $$PRED(x,y)=(P(x+(y/2),-1)+2*P(x+(y/2)+1,-1)+P(x+(y/2)+2,-1)+2)/4.$$

When intra 4×4 prediction mode 8 (e.g., horizontal-up) is available (e.g., at least samples P(−1,y), where y=0 . . . 3, are available), the values of the prediction samples PRED(x,y), with x,y=0 . . . 3 may be generated as follows:

For (x+2*y)=0, 2, 4, $$PRED(x,y)=(P(-1,y+(x/2))+P(-1,y+(x/2)+1)+1)/2.$$

For (x+2*y)=1, 3, $$PRED(x,y)=(P(-1,y+(x/2))+2*P(-1,y+(x/2)+1)+P(-1,y+(x/2)+2)+2)/4.$$

For (x+2*y)=5, $$PRED(x,y)=(P(-1,2)+3*P(-1,3)+2)/4.$$

For (x+2*y)>5, $$PRED(x,y)=(P(-1,3)).$$

The present invention may provide more alternative modes during intra prediction than conventional approaches. Within the intra processing, when macroblock prediction is in the intra 4×4 mode (e.g., as defined by the H.264 specification), the picture element luma prediction in modes 3 and 7 may be enabled even though a column of samples adjacent to the left edge of the sub-block to be predicted is not available. Similarly, picture element prediction in mode 8 may be enabled even though a row of samples adjacent to the top edge of sub-block to be predicted is not available. The present invention may provide a simplification of the implementation without significant loss of function.

The function performed by the flow diagram of FIG. 11 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of application specific integrated circuits (ASICs), application specific standard products (ASSPs), field programmable gate arrays (FPGAs), or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMS, RAMS, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a first processing circuit configured to generate a plurality of reconstructed samples in response to one or more macroblocks of an input signal; and
    a second processing circuit configured to determine availability of intra 4×4 prediction modes for each luma sub-block of a current macroblock in response to available reconstructed samples adjacent to said current macroblock, wherein (i) an intra 4×4 prediction mode 3 and an intra 4×4 prediction mode 7 are indicated as available when a first group of said reconstructed samples only adjacent to a top edge of a current luma sub-block of said current macroblock is available and a second group of said reconstructed samples only adjacent to a left edge of said current luma sub-block is not available and (ii) an intra 4×4 prediction mode 8 is indicated as available when said first group of said reconstructed samples only adjacent to said top edge of said current luma sub-block is not available and said second group of said reconstructed samples only adjacent to said left edge of said current luma sub-block is available.

2. The apparatus according to claim 1, wherein said second circuit is further configured to indicate availability of said intra 4×4 prediction modes 3, 7 and 8 for each of said luma sub-blocks when both said first group of said reconstructed samples adjacent to said top edge of said current luma sub-block and said second group of said reconstructed samples adjacent to said left edge of said current luma sub-block are available.

3. The apparatus according to claim 1, wherein said second processing circuit is implemented in a decoding loop of an encoder.

4. The apparatus according to claim 1, wherein said first processing circuit and said second processing circuit comprise a decoder.

5. The apparatus according to claim 1, wherein said apparatus comprises an H.264 decoder.

6. The apparatus according to claim 1, wherein said second processing circuit comprises:
an intra prediction circuit configured to generate an intra predicted luma sub-block in response to said available reconstructed samples adjacent to a single edge of said current luma sub-block.

7. The apparatus according to claim 6, wherein said second processing circuit further comprises:
a control circuit configured to generate one or more control signals in response to (i) said first group of said reconstructed samples adjacent to a top edge of said current luma sub-block being available, (ii) said second group of said reconstructed samples adjacent to a left edge of said current luma sub-block being available and (iii) both said first group and said second group of said reconstructed samples being available.

8. The apparatus according to claim 7, wherein said control circuit is further configured to determine a position of said top edge and said left edge of said current luma sub-block.

9. The apparatus according to claim 8, wherein said first group of said reconstructed samples comprises a plurality of reconstructed samples in a line adjacent to said top edge of said current luma sub-block.

10. The apparatus according to claim 8, wherein (i) said second group of said reconstructed samples comprises a plurality of reconstructed samples in a line adjacent to said left edge of said current luma sub-block.

11. The apparatus according to claim 7, wherein said control circuit comprises:
a plurality of first logic gates configured to generate a first control signal in response to (i) said first group of said reconstructed samples being available and (ii) both said first group and said second group of said reconstructed samples being available; and
a plurality of second logic gates configured to generate a second control signal in response to (i) said second group of said reconstructed samples being available and (ii) both said first group and said second group of said reconstructed samples being available.

12. An apparatus comprising:
means for generating a plurality of reconstructed samples in response to one or more macroblocks of an input signal; and
means for determining availability of intra 4×4 prediction modes for each luma sub-block of a current macroblock in response to available reconstructed samples adjacent to said current macroblock, wherein (i) an intra 4×4 prediction mode 3 and an intra 4×4 prediction mode 7 are indicated as available when a first group of said reconstructed samples only adjacent to a top edge of a current luma sub-block of said current macroblock is available and a second group of said reconstructed samples only adjacent to a left edge of said current luma sub-block is not available and (ii) an intra 4×4 prediction mode 8 is indicated as available when said first group of said reconstructed samples only adjacent to said top edge of said current luma sub-block is not available and said second group of said reconstructed samples only adjacent to said left edge of said current luma sub-block is available.

13. A method for intra prediction of a luma sub-block comprising the steps of:
(A) generating a plurality of reconstructed samples in response to one or more macroblocks of an input signal; and
(B) determining availability of intra 4×4 prediction modes for each luma sub-block of a current macroblock in response to available reconstructed samples adjacent to said current macroblock, wherein (i) an intra 4×4 prediction mode 3 and an intra 4×4 prediction mode 7 are indicated as available when a first group of said reconstructed samples only adjacent to a top edge of a current luma sub-block of said current macroblock is available and a second group of said reconstructed samples only adjacent to a left edge of said current luma sub-block is not available and (ii) an intra 4×4 prediction mode 8 is indicated as available when said first group of said reconstructed samples only adjacent to said top edge of said current luma sub-block is not available and said second group of said reconstructed samples only adjacent to said left edge of said current luma sub-block is available.

14. The method according to claim 13, wherein the step (B) further comprises:
generating an intra predicted luma sub-block according to said intra 4×4 prediction mode 3 in response to (i) said first group of said reconstructed samples adjacent to a top edge of said current luma sub-block being available and (ii) both said first group and said second group of said reconstructed samples adjacent to said left edge of said current luma sub-block being available.

15. The method according to claim 13, wherein the step (B) further comprises:
generating an intra predicted luma sub-block according to said intra 4×4 prediction mode 7 in response to (i) said first group of said reconstructed samples adjacent to said top edge of said current luma sub-block being available and (ii) both said first group and said second group of said reconstructed samples adjacent to said left edge of said current luma sub-block being available.

16. The method according to claim 13, wherein the step (B) further comprises:
generating an intra predicted luma sub-block according to said intra 4×4 prediction mode 8 in response to (i) said second group of said reconstructed samples adjacent to said left edge of said current luma sub-block being available and (ii) both said second group and said first group of said reconstructed samples adjacent to said top edge of said current luma sub-block being available.

17. The method according to claim 13, wherein the step (B) further comprises:

generating one or more control signals indicating availability of each of said intra 4×4 prediction modes 3, 7 and 8 in response to availability of said reconstructed samples adjacent to said current macroblock.

18. The method according to claim 17, wherein the step (B) further comprises:

enabling intra 4×4 prediction modes 3 and 7 in response to said one or more control signals indicating said available reconstructed samples being adjacent to a top edge of said luma sub-block; and enabling intra 4×4 prediction mode 8 in response to said one or more control signals indicating said available reconstructed samples being adjacent to a left edge of said luma sub-block.

19. The method according to claim 13, wherein the step (B) further comprises:

determining a position of a top edge and a left edge of said current luma sub-block.

20. The method according to claim 19, wherein the step (B) further comprises:

determining availability of a plurality of reconstructed samples in a line adjacent to said top edge of said current luma sub-block; and determining availability of a plurality of reconstructed samples in a line adjacent to said left edge of said luma sub-block.

21. The method according to claim 20, further comprising the steps of:

providing an indication that a diagonal down-left prediction mode and a vertical-left prediction mode are available in response to said plurality of reconstructed samples in said line adjacent to said top edge of said current luma sub-block being available;

providing an indication that a horizontal-up prediction mode is available in response to said plurality of reconstructed samples in said line adjacent to said left edge of said current luma sub-block being available; and providing an indication that at least said diagonal down-left prediction mode, said vertical-left prediction mode and said horizontal-up prediction mode are available in response to said plurality of reconstructed samples in said line adjacent to said top edge of said current luma sub-block and said line adjacent to said left edge of said current luma sub-block being available.

22. A computer readable medium comprising computer executable instructions for causing a computer to perform the method according to claim 13.

* * * * *